(12) United States Patent
Hao et al.

(10) Patent No.: US 12,107,647 B2
(45) Date of Patent: Oct. 1, 2024

(54) SIGNALING DESIGN FOR NON-PMI BASED CSI FEEDBACK

(71) Applicant: QUALCOMM Incorporated, San Diego, CA (US)

(72) Inventors: Chenxi Hao, Beijing (CN); Yu Zhang, Beijing (CN); Chao Wei, Beijing (CN); Liangming Wu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 865 days.

(21) Appl. No.: 16/649,097

(22) PCT Filed: Sep. 22, 2017

(86) PCT No.: PCT/CN2017/102901
§ 371 (c)(1),
(2) Date: Mar. 19, 2020

(87) PCT Pub. No.: WO2019/056292
PCT Pub. Date: Mar. 28, 2019

(65) Prior Publication Data
US 2020/0274598 A1    Aug. 27, 2020

(51) Int. Cl.
*H04B 7/06*      (2006.01)
*H04B 7/0456*   (2017.01)

(52) U.S. Cl.
CPC ......... *H04B 7/0626* (2013.01); *H04B 7/0486* (2013.01); *H04B 7/0639* (2013.01); *H04B 7/0665* (2013.01)

(58) Field of Classification Search
CPC .................................................. H04B 7/0626

USPC ......................................................... 375/267
See application file for complete search history.

(56) References Cited

U.S. PATENT DOCUMENTS

| | | | |
|---|---|---|---|
| 9,019,902 B2 | 4/2015 | Damnjanovic et al. | |
| 9,681,425 B2 | 6/2017 | Geirhofer et al. | |
| 2009/0110114 A1 | 4/2009 | Onggosanusi et al. | |
| 2010/0226455 A1 | 9/2010 | Porat et al. | |
| 2011/0216846 A1 | 9/2011 | Lee et al. | |
| 2014/0003395 A1 | 1/2014 | Hsu et al. | |
| 2014/0029689 A1* | 1/2014 | Liu .................... | H04B 7/0456 375/267 |
| 2014/0105162 A1 | 4/2014 | Li et al. | |
| 2014/0119213 A1* | 5/2014 | Devarasetty ......... | H04L 5/0091 370/252 |
| 2014/0126402 A1 | 5/2014 | Nam et al. | |

(Continued)

FOREIGN PATENT DOCUMENTS

| | | | |
|---|---|---|---|
| CN | 102594520 A | 7/2012 | |
| CN | 102823154 A | 12/2012 | |

(Continued)

OTHER PUBLICATIONS

International Search Report and Written Opinion—PCT/CN2017/102046—ISA/EPO—May 30, 2018.

(Continued)

*Primary Examiner* — Lihong Yu
(74) *Attorney, Agent, or Firm* — QUALCOMM Incorporated

(57) ABSTRACT

Certain aspects of the present disclosure provide techniques and apparatus for signaling precoder(s) for non-PMI based CSI feedback.

30 Claims, 10 Drawing Sheets

(56) References Cited

U.S. PATENT DOCUMENTS

| | | | |
|---|---|---|---|
| 2014/0192916 A1 | 7/2014 | Gomadam et al. | |
| 2015/0023260 A1 | 1/2015 | Chiu et al. | |
| 2016/0211892 A1* | 7/2016 | Li | H04B 17/336 |
| 2016/0323022 A1 | 11/2016 | Rahman et al. | |
| 2017/0208568 A1* | 7/2017 | Nam | H04L 5/0091 |
| 2017/0331535 A1 | 11/2017 | Wei et al. | |
| 2018/0309530 A1* | 10/2018 | Nguyen | H04L 1/1812 |
| 2019/0190569 A1* | 6/2019 | Nayeb Nazar | H04B 7/0639 |

FOREIGN PATENT DOCUMENTS

| | | |
|---|---|---|
| CN | 103391158 A | 11/2013 |
| CN | 103746779 A | 4/2014 |
| CN | 104184537 A | 12/2014 |
| CN | 104508997 A | 4/2015 |
| CN | 105103463 A | 11/2015 |
| CN | 106452544 A | 2/2017 |
| CN | 106656292 A | 5/2017 |
| CN | 106664131 A | 5/2017 |
| CN | 106685496 A | 5/2017 |
| CN | 106685582 A | 5/2017 |
| CN | 106961296 A | 7/2017 |
| EP | 2648443 A1 | 10/2013 |
| WO | WO-2008098093 A2 | 8/2008 |
| WO | WO-2010056763 | 5/2010 |
| WO | 2011159217 A1 | 12/2011 |
| WO | 2012108913 A1 | 8/2012 |
| WO | 2013169666 | 11/2013 |
| WO | 2017138750 A1 | 8/2017 |

OTHER PUBLICATIONS

International Search Report and Written Opinion—PCT/CN2017/101355—ISA/EPO—Jun. 14, 2018.

International Search Report and Written Opinion—PCT/CN2017/102901—ISA/EPO—May 30, 2018.

LG Electronics: Feedback Codebook Enhancement and Performance Evaluation, 3GPP TSG RAN WG1 Meeting #62, R1-104768, Aug. 28, 2010, 9 pages.

Ericsson: "On Remaining Details of CSI Measurement", 3GPP TSG-RAN WG1 #91, 3GPP Draft; R1-1720733 On Remaining Details of CSI Measurement, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, 10 Pages, Nov. 18, 2017 (Nov. 18, 2017), XP051370190, Retrieved from the Internet: URL: http://www.3gpp.org/ftp/tsg%5Fran/WG1%5FRL1/TSGR1%5F91/Docs/ [retrieved on Nov. 18, 2017] the whole document.

Supplementary European Search Report—EP17926301—Search Authority—Munich—Apr. 1, 2021.

Zte, et al., "Correction to the Condition of Enabling PMI Feedback", 3GPP TSG-RAN WG1 Meeting #66, 3GPP Draft; R1-112842 36.213 CR0347R1 (REL-10, F) Correction to the Condition of Enabling PMI Feedback, 3rd Generation Partnership Project (3GPP), Mobile Competence Centre; 650, Route Des Lucioles; F-06921 Sophia-Antipolis Cedex; France, vol. RAN WG1, No. Athens, Greece; Aug. 22, 2011-Aug. 26, 2011, Aug. 26, 2011 (Aug. 26, 2011), 7 Pages, XP050537982, [retrieved on Aug. 26, 2011] Paragraphs [07.2], [7.2.1].

Zte, et al., "Way Forward on Reciprocity based CSI", 3GPP TSG RAN WG1 Meeting NR#3, 3GPP Draft; R1-1716804 WF on Reciprocity based CSI V3, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep.18, 2017-Sep. 21, 2017, Sep. 20, 2017 (Sep. 20, 2017), 3 Pages, XP051353885, Retrieved from the Internet: URL: http://www.3gpp.org/ftp/tsg_ran/WG1_RL1/TSGR1_AH/NR_AH_1709/Docs/ [retrieved on Sep. 20, 2017] the whole document.

CATT: "Further Discussion on Reciprocity Based Operation", 3GPP TSG RAN WG1 Meeting #90, R1-1712370, Prague, Czechia, Aug. 21-25, 2017, 3 Pages.

Nokia Networks: "Study on Elevation Beamforming/Full-Dimension (FD) MIMO for LTE", Status Report to TSG 12.4.02, RP-150734, 3GPP TSG RAN meeting #68, Malmo, Sweden, Jun. 15-18, 2015, Jun. 9, 2015, 11 Pages.

NTT Docomo, et al., "New Radio (NR) Access Technology", 3GPP Draft, 3GPP TSG RAN Meeting #77, RP-171783, SR ON NR-WID, Status Report to TSG, 3rd Generation Partnership Project (3GPP), Mobile Competence Centre, 650, Route Des Lucioles, F-06921 Sophia-Antipolis Cedex, France, vol. TSG RAN, No. Sapporo, Japan, 20170911-20170914, Sep. 6, 2017 (Sep. 6, 2017), XP051668625, 284 p. Retrieved from the Internet: URL: http://www.3gpp.org/ftp/tsg%5Fran/TSG%5FRAN/TSGR%5F77/Docs/RP%2D171783%2Ezip [retrieved on Sep. 6, 2017], Section: Scheduling and HARQ Aspects; p. 52-p. 63.

* cited by examiner

Rank-1: $\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix}$ Rank-2: $\begin{bmatrix} 1 & 0 \\ 0 & 1 \\ 0 & 0 \\ 0 & 0 \end{bmatrix}, \begin{bmatrix} 1 & 0 \\ 0 & 0 \\ 0 & 1 \\ 0 & 0 \end{bmatrix}, \begin{bmatrix} 1 & 0 \\ 0 & 0 \\ 0 & 0 \\ 0 & 1 \end{bmatrix}, \begin{bmatrix} 0 & 0 \\ 1 & 0 \\ 0 & 1 \\ 0 & 0 \end{bmatrix}, \begin{bmatrix} 0 & 0 \\ 1 & 0 \\ 0 & 0 \\ 0 & 1 \end{bmatrix}, \begin{bmatrix} 0 & 0 \\ 0 & 0 \\ 1 & 0 \\ 0 & 1 \end{bmatrix}$

FIG. 8

SIGNALING DESIGN FOR NON-PMI BASED CSI FEEDBACK

This application for Patent is a national stage application under 35 U.S.C. § 371 of PCT/CN2017/102901, filed Sep. 22, 2017, which is assigned to the assignee hereof and hereby expressly incorporated by reference herein as if fully set forth below and for all applicable purposes.

BACKGROUND

Field of the Disclosure

Aspects of the present disclosure relate generally to wireless communications systems, and more particularly, to techniques for signaling precoder(s) to a UE for non-precoding matrix indicator (PMI) based channel state information (CSI) feedback.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for signaling precoder(s) to a UE for non-PMI based CSI feedback.

Certain aspects of the present disclosure provide a method for wireless communication that may be performed, for example, by a base station (BS). The method generally includes determining, for each rank, one or more precoders available to a user equipment (UE) for reporting feedback to the BS. The method also includes generating a precoder configuration having a differential structure. The differential structure of the precoder configuration implicitly indicates, from a plurality of ports, one or more ports associated with one of the precoders for each rank. The method further includes signaling the precoder configuration to the UE.

Certain aspects of the present disclosure provide a method for wireless communication that may be performed, for example, by a user equipment (UE). The method generally includes receiving a precoder configuration having a differential structure from a base station (BS). The method also includes determining, for each rank, one or more ports, from a plurality of ports, associated with one of a plurality of precoders available for reporting feedback to the BS, based on the differential structure of the precoder configuration. The method further includes reporting feedback to the BS based on the determined one or more ports associated with one of the precoders.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 8 illustrates a example port-selection codebook for rank-1 and rank-2, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
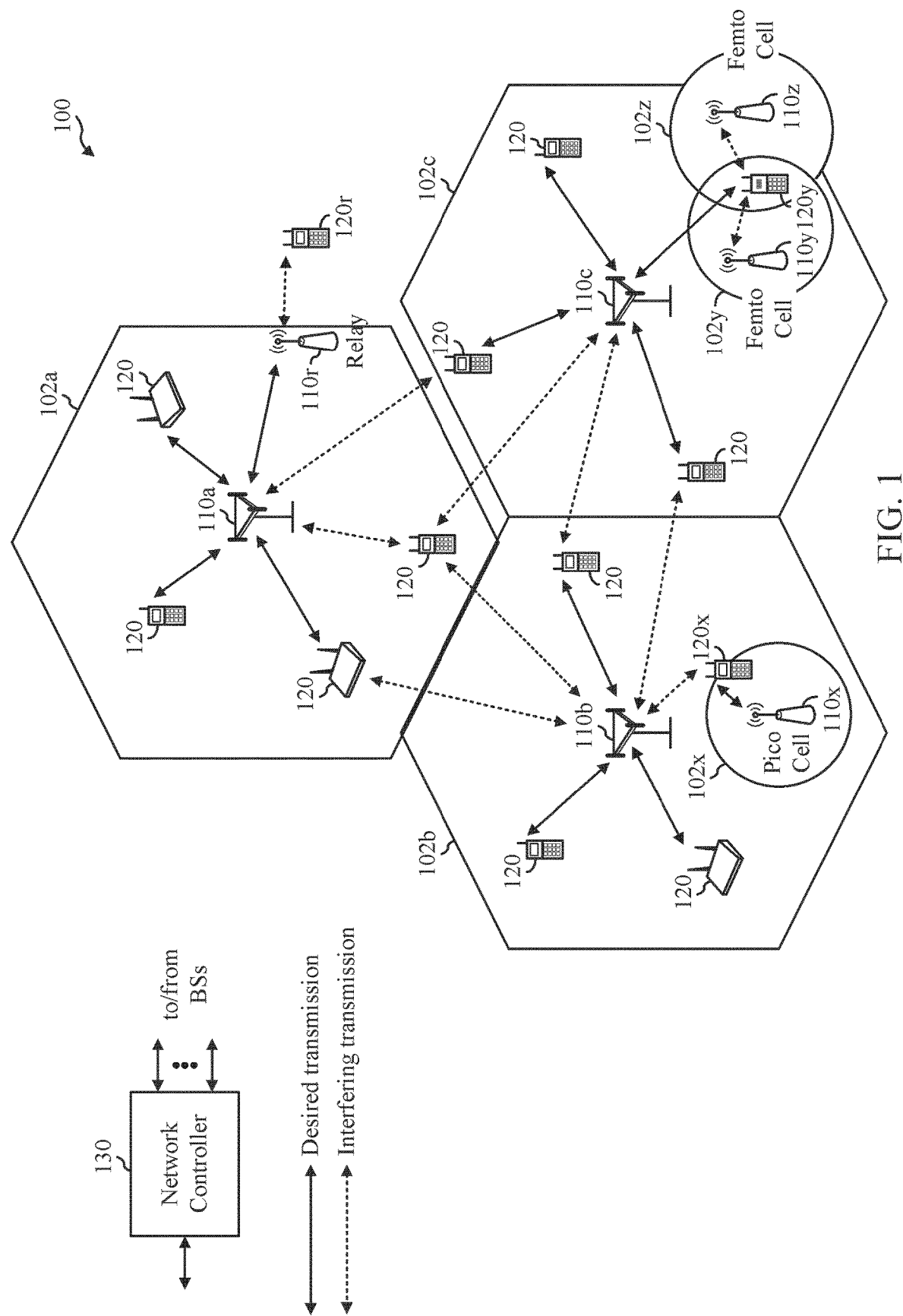
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure provide techniques and apparatus for signaling precoder(s) to a UE for non-PMI based CSI feedback. Particularly, aspects provide techniques for explicitly signaling the precoder(s) for each rank to the UE and/or implicitly signaling the precoder(s) for each rank to the UE (e.g., for non-PMI based CSI feedback).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved U IRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. BS 110 may determine, for each rank, one or more precoders available to UE 120 for reporting feedback (e.g., channel state information (CSI) feedback) to the BS 110. BS 110 may generate a precoder configuration that includes an indication of one of the precoders for each rank. In one aspect, the precoder configuration may include an explicit indication of the precoder for each rank. In one aspect, the precoder configuration may include an implicit indication of the precoder for each rank. For example, as described below, the precoder configuration may have a nested structure (or differential structure) that implicitly indicates one of the precoders for each rank. BS 110 may signal the precoder configuration to UE 120.

Once the UE 120 receives the precoder configuration, the UE 120 may determine (based on the explicit or implicit indication in the configuration) the precoder to use for reporting feedback to the BS for a given rank. For example, UE 120 may receive one or more channel state information reference signals (CSI-RS) from the BS 110 on one or more ports (e.g., CSI-RS ports). The UE 120 may perform channel estimation based on the CSI-RSs and select a rank (e.g., preferred rank). UE 120 may determine (from the received configuration) a precoder associated with the selected rank, and calculate a channel quality indicator (CQI) based on the rank and precoder. UE 120 may report the CQI and/or rank indication to BS 110.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BS for the femto cells 102*y* and 102*z*, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, a macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G NB, NB, TRP, AP) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
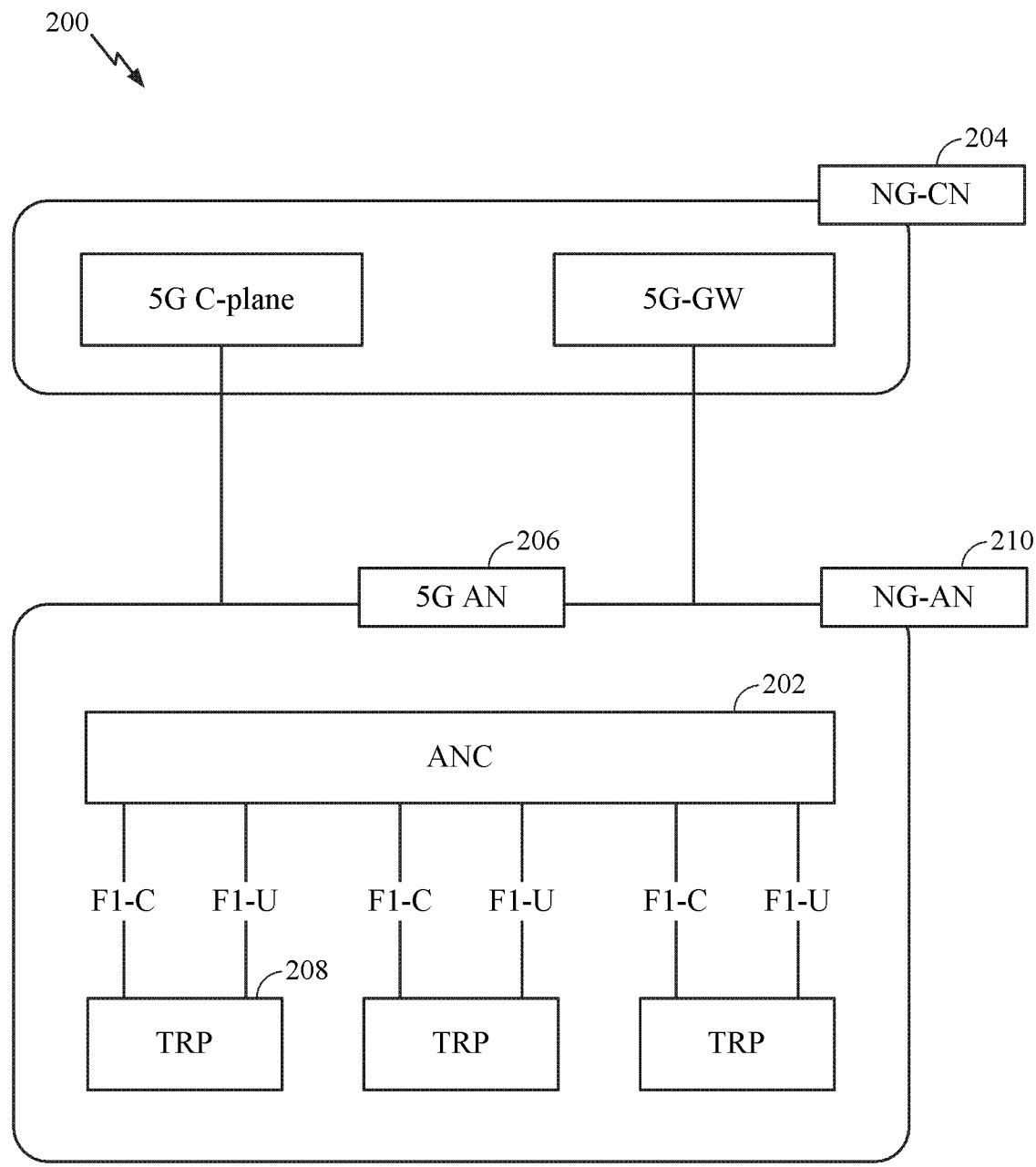
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
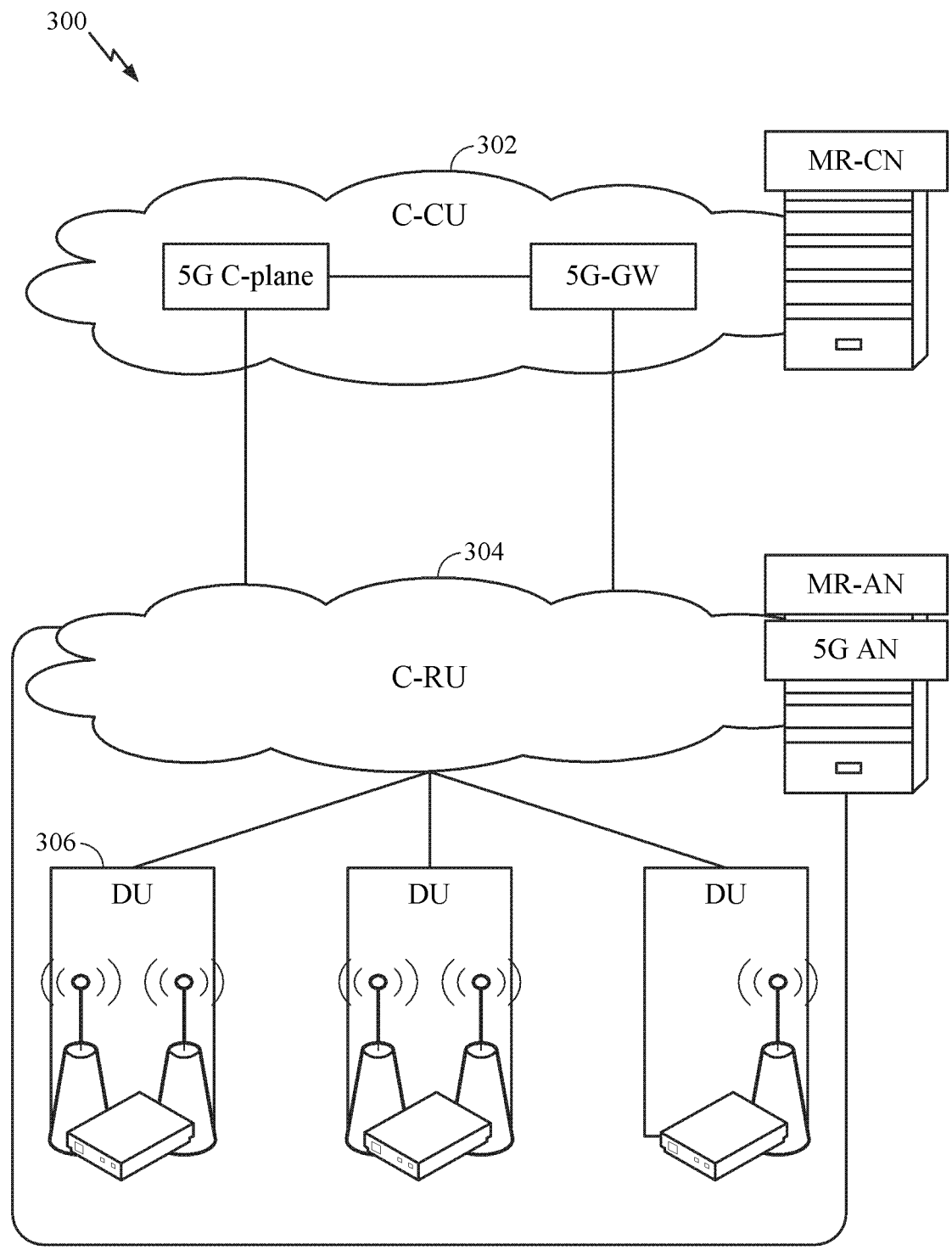
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
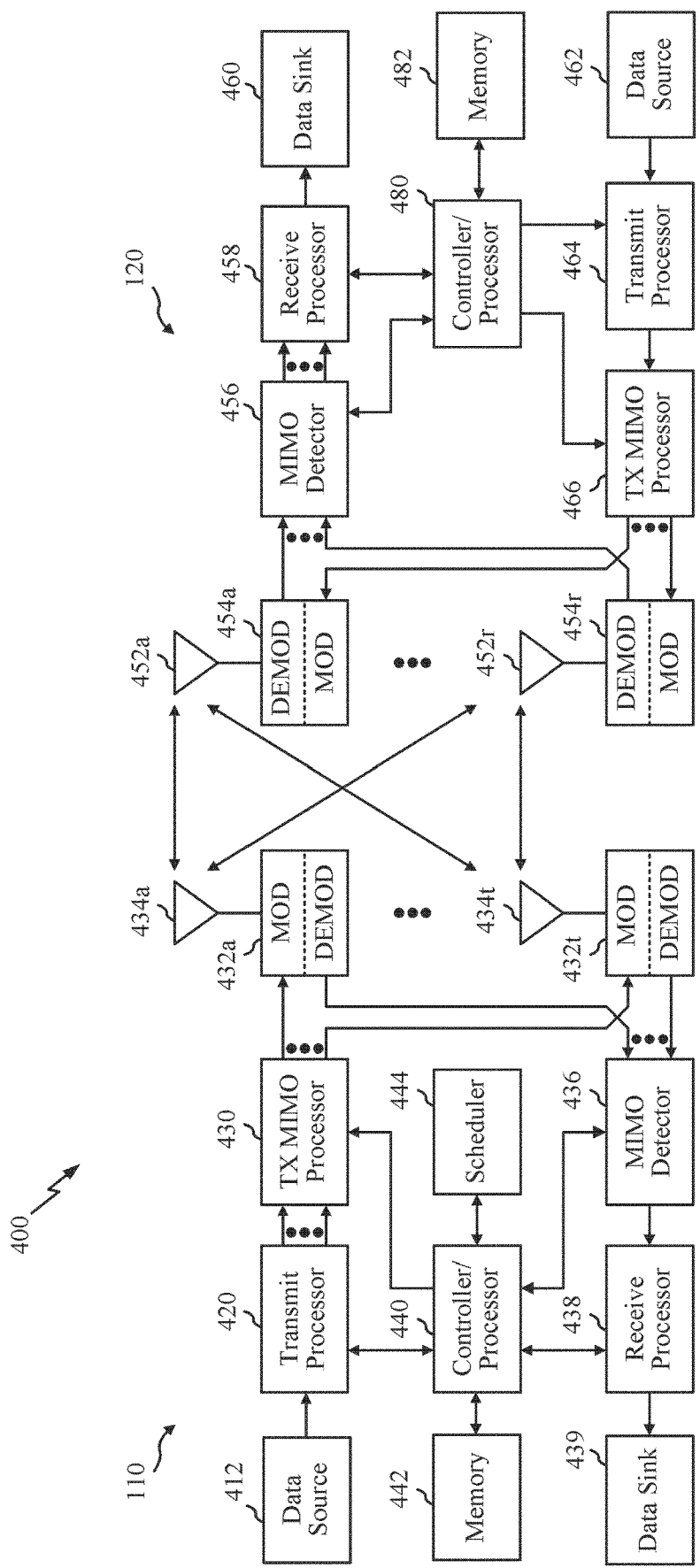
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 may be used to perform the operations described herein and illustrated with reference to FIG. 11 and antennas 434, processors 460, 420, 438, and/or controller/processor 440 of the BS 110 may be used to perform the operations described herein and illustrated with reference to FIG. 10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 480 and/or other processors and modules at the UE 120 may also perform or direct, e.g., the execution of the functional blocks illustrated in FIG. 11 and/or other processes for the techniques described herein. The processor 440 and/or other processors and modules at the BS 110 may also perform or direct, e.g., the execution of the functional blocks illustrated in FIG. 10, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
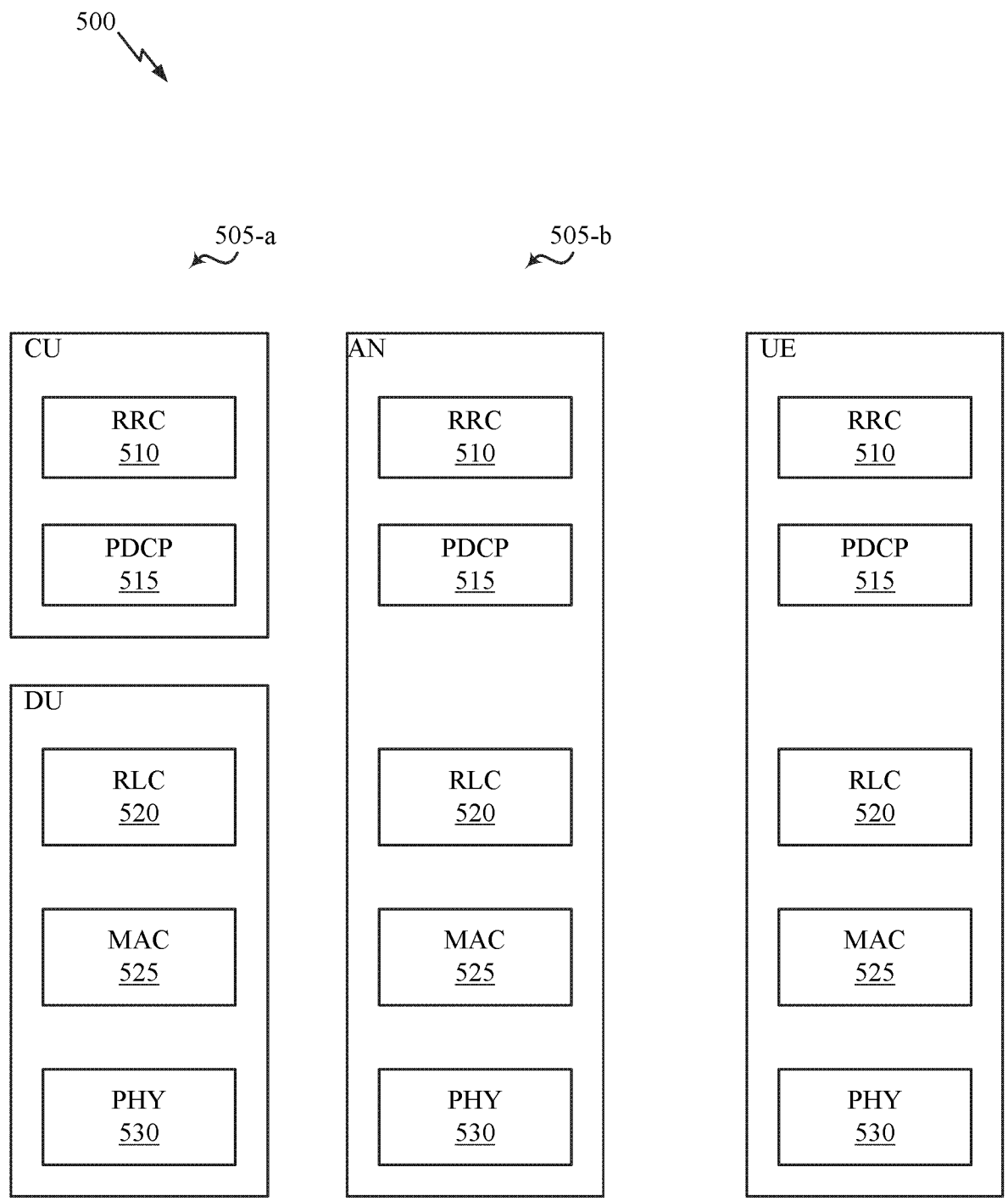
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
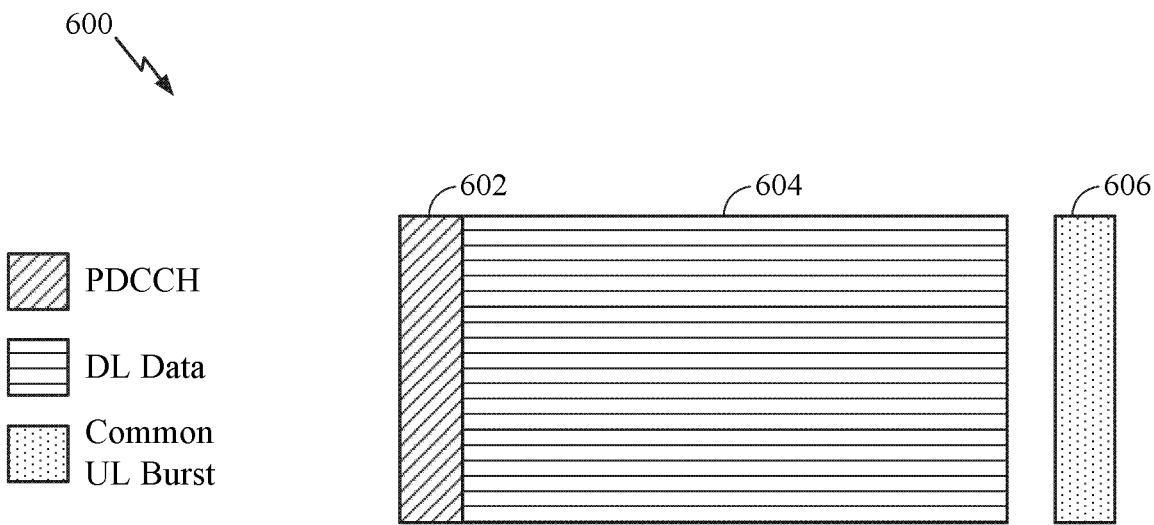
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
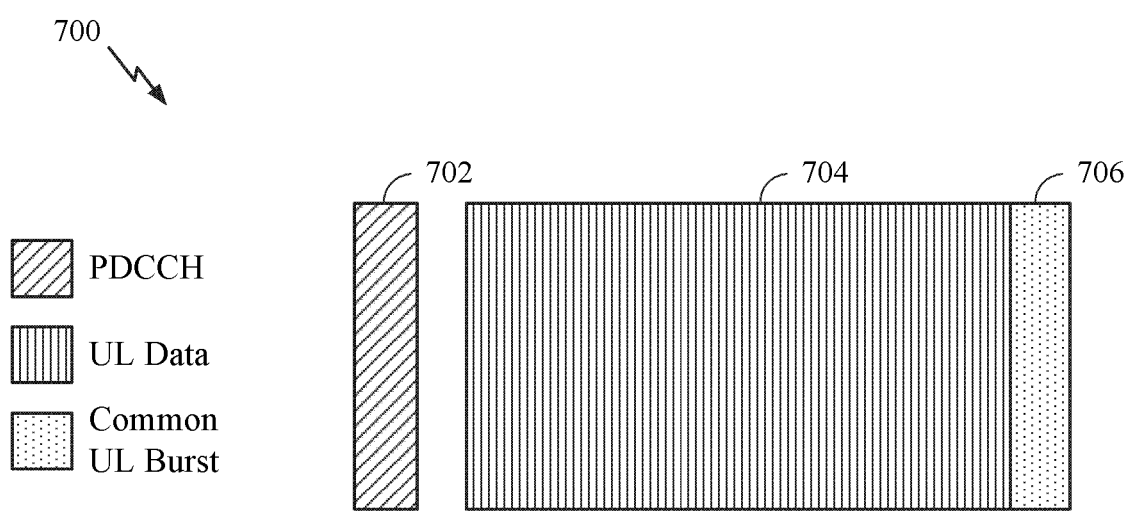
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In wireless communications, channel state information (CSI) may refers to known channel properties of a communication link. The CSI may represent the combined effects of, for example, scattering, fading, and power decay with distance between a transmitter and receiver. Channel estimation may be performed to determine these effects on the channel CSI may be used to adapt transmissions based on the current channel conditions, which is useful for achieving reliable communication, in particular, with high data rates in multi-antenna systems. CSI is typically estimated at the receiver, quantized, and fed back to the transmitter.

Example Signaling Design for Non-PMI Based Feedback

Certain systems may support PMI based feedback and/or non-PMI based feedback. For PMI based feedback, the UE may report a rank indicator (RI), a precoding matrix indicator (PMI), and associated channel quality indicator (CQI). For example, the UE may receive from a BS one or more CSI-RSs of one or more (CSI-RS) ports. The CSI-RSs received by the UE may include beamformed CSI-RSs and/or non-beamformed CSI-RSs. The UE may perform channel estimation based on the CSI-RSs, and select a preferred RI and PMI from a set of precoders (e.g., a codebook), based on the channel estimation. The UE may calculate CQI based on the RI and PMI, and report the selected RI, PMI and CQI to the BS.

For non-PMI based feedback, the UE may report RI and CQI without reporting PMI. In this CSI feedback scheme, once the UE receives from a BS one or more CSI-RSs of one or more (CSI-RS) ports, the UE may calculate CQI based on a pre-defined single precoder per rank. In some aspects, the precoder may be indicated by the network (e.g., BS), based on a port-selection codebook. The port-selection codebook may include one or more candidate precoding matrices for each rank R, and each candidate precoding matrix may contain only one non-zero entry in each column.

FIG. 8 illustrates a reference example of a port-selection codebook for rank-1 and rank-2 for a four ports case. As shown, for rank-1, the port-selection codebook includes four rows, each row corresponding to one of the four ports. The port-selection codebook for rank-1 includes four (4×1) candidate precoding matrices, and each candidate matrix includes a single non-zero entry (e.g., in each column). For rank-2, the port-selection codebook includes six (4×2) candidate precoding matrices, and each candidate matrix includes a single non-zero entry in each column.

Based on the port-selection codebook, the network for each rank R can indicate which R ports are used to transmit the R layers. Thus, for rank-1, the network can indicate which single port of the four ports is used to transmit a single layer of feedback; for rank-2, the network can indicate which two ports of the four ports is used to transmit the two layers of feedback; and so on. However, while the network may indicate the predefined single precoder per rank to the UE, one issue may relate to how to design the indication of the precoder per rank to the UE, e.g., to reduce overhead, UE processing complexity and possible performance losses.

Aspects presented herein provide techniques for explicitly and/or implicitly signaling precoder(s) to a UE for non-PMI based CSI feedback.

In some aspects, the BS may provide an explicit precoder configuration for each rank. The BS may determine, for each rank, one or more precoders available to a UE, and generate a precoder configuration that explicitly indicates one or more ports associated with one of the precoders for each rank.

In some aspects, the (explicit) precoder configuration may include a bitmap, where a size of the bitmap is based on a maximum rank and a maximum number of ports. A first one or more bits of the bitmap may indicate a first set of ports associated with a first precoder for a first rank, and at least a second one or more bits of the bitmap may indicate a second set of ports associated with a second precoder for a second rank. In one reference example, the bitmap may include $R_{max}$*X bits, where $R_{max}$ is the maximum rank, and X is the number of ports. In this bitmap, the first X bits (e.g., the $1^{st}$ to the $X^{th}$ bit) may be used for the rank-1 port indication. That is, there may be a single "1" in the first X bits, where the index of "1" indicates the corresponding port is used as the precoder for rank-1. The second X bits (e.g., the $(X+1)^{th}$ bit to the $2X^{th}$ bit) may be used for the rank-2 port indication. That is, there may be two "1"s in the second X bits, where the indices of the two "1"s indicates the corresponding two ports are used as the precoder for rank-2. Thus, in general, the $R^{th}$ X bits (e.g., the $((R-1)*X+1)^{th}$ bit to the $RX^{th}$ bit) may be used for the rank-R port indication, where R={1, . . . , $R_{max}$}. The indices of the R "1"s in the $R^{th}$ X bits may indicate the corresponding R ports are used as the precoder for rank R. In some cases, if $R_{max}$=X, then ($R_{max}$−1)*X bits may be used for the bitmap, as the BS may not have to indicate the port-selection for rank $R_{max}$=X (e.g., all the ports may be selected).

Figure 9:
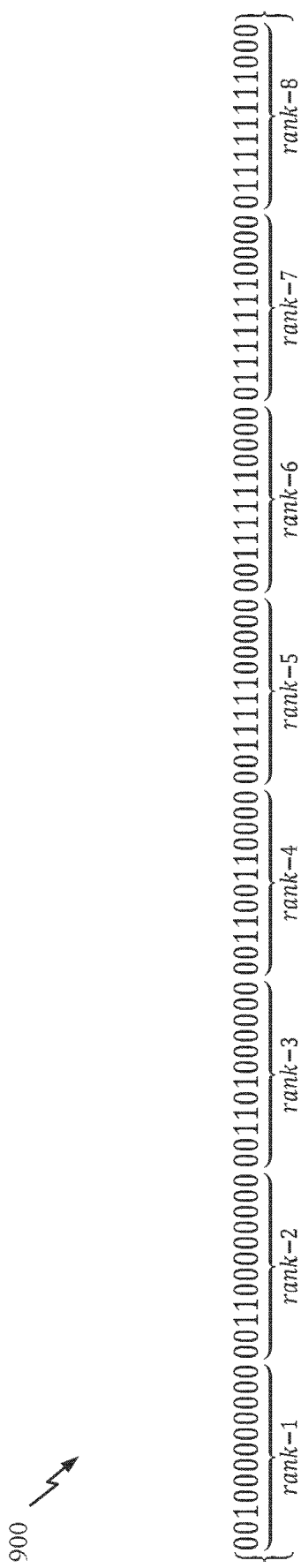
FIG. 9 illustrates an example bitmap for an explicit precoder configuration, in accordance with certain aspects of the present disclosure.

FIG. 9 illustrates an example bitmap 900 that may be used by the BS to signal an explicit precoder configuration for each rank, in accordance with certain aspects of the present disclosure. In this example, bitmap 900 includes 96 bits (e.g., $R_{max}$=8 and X=12). As shown, the first 12 bits of bitmap 900 indicate that the $3^{rd}$ port is used as the precoder for rank-1; the second 12 bits of bitmap 900 indicate that the $3^{rd}$ and $4^{th}$ ports are used as the precoder for rank-2; the third 12 bits of bitmap 900 indicate that the $3^{rd}$, $4^{th}$ and $6^{th}$ ports are used as the precoder for rank-3; the fourth 12 bits of bitmap 900 indicate that the $3^{rd}$, $4^{th}$ $7^{th}$ and $8^{th}$ ports are used as the precoder for rank-4; the fifth 12 bits of bitmap 900 indicate that the $3^{rd}$, $4^{th}$ $5^{th}$ $6^{th}$ and $7^{th}$ ports are used as the precoder for rank-5; the sixth 12 bits of bitmap 900 indicate that the $3^{rd}$, $4^{th}$ $5^{th}$ $6^{th}$, $7^{th}$ and $8^{th}$ ports are used as the precoder for rank-6; the seventh 12 bits of bitmap 900 indicate that the $2^{nd}$, $3^{rd}$ $4^{th}$ $5^{th}$ $6^{th}$ $7^{th}$ and $8^{th}$ ports are used as the precoder for rank-7; and the eighth 12 bits of bitmap 900 indicate that the $2^{nd}$, $3^{rd}$ $4^{th}$ 5th $6^{th}$ $7^{th}$ $8^{th}$ and $9^{th}$ ports are used as the precoder for rank-8.

In some aspects, the (explicit) precoder configuration may include, for each rank, one or more bits indicating one or more different sets of ports associated with the rank. The mapping from the one or more different sets of ports to the one or more bits may be determined based on a table or a set of tables. For example, for a given rank R, there may be $$\binom{X}{R}$$

possible port combinations for rank R, where R=1, 2, ..., $R_{max}$. In such cases, the BS may jointly encode the port-index per rank to indicate the possible port combinations for each rank. In one reference example, the BS may use $$\left\lceil \log_2\binom{X}{R} \right\rceil$$

bits for the indication of possible port combinations for a given rank R. In some cases, the BS and/or UE may use a table or set of tables to obtain the $$\left\lceil \log_2\binom{X}{R} \right\rceil$$

bits based on the configured R ports from the X ports. The BS may cascade the per-rank indications to form the (explicit) precoder configuration. The number of bits for (the indication of all ranks) in the precoder configuration may be equal to $$\Sigma_{R=1}^{R_{max}} \left\lceil \log_2\binom{X}{R} \right\rceil.$$

Assuming $R_{max}$=8, and X=12, the precoder configuration may include 67 bits. For example, there may be 4 bits for rank 1, 7 bits for rank-2, 8 bits for rank-3, 9 bits for rank-4, 10 bits for rank 5, 10 bits for rank-6, 10 bits for rank-7 and 9 bits for rank-8.

In some aspects, the (explicit) precoder configuration may include one or more bits indicating one or more different sets of ports associated with all ranks. That is, in some aspects, the BS may use $$\left\lceil \log \Pi_{R=1}^{R_{max}}\binom{X}{R} \right\rceil$$

bits to jointly encode all the possible port combinations for all ranks (e.g., as opposed to jointly encoding for each individual rank). The mapping from the one or more different sets of ports associated with all ranks to the one or more bits may be determined based on a table or set of tables. That is, the BS and/or UE may use a table or set of tables to obtain the $$\left\lceil \log \Pi_{R=1}^{R_{max}}\binom{X}{R} \right\rceil$$

bits based on the possible port combinations for all ranks. Assuming $R_{max}$=8, and X=12, this precoder configuration may include 65 bits.

In some aspects, the BS may implicitly signal the precoder(s) for each rank to the UE (e.g., for non-PMI based CSI feedback).

Figure 10:
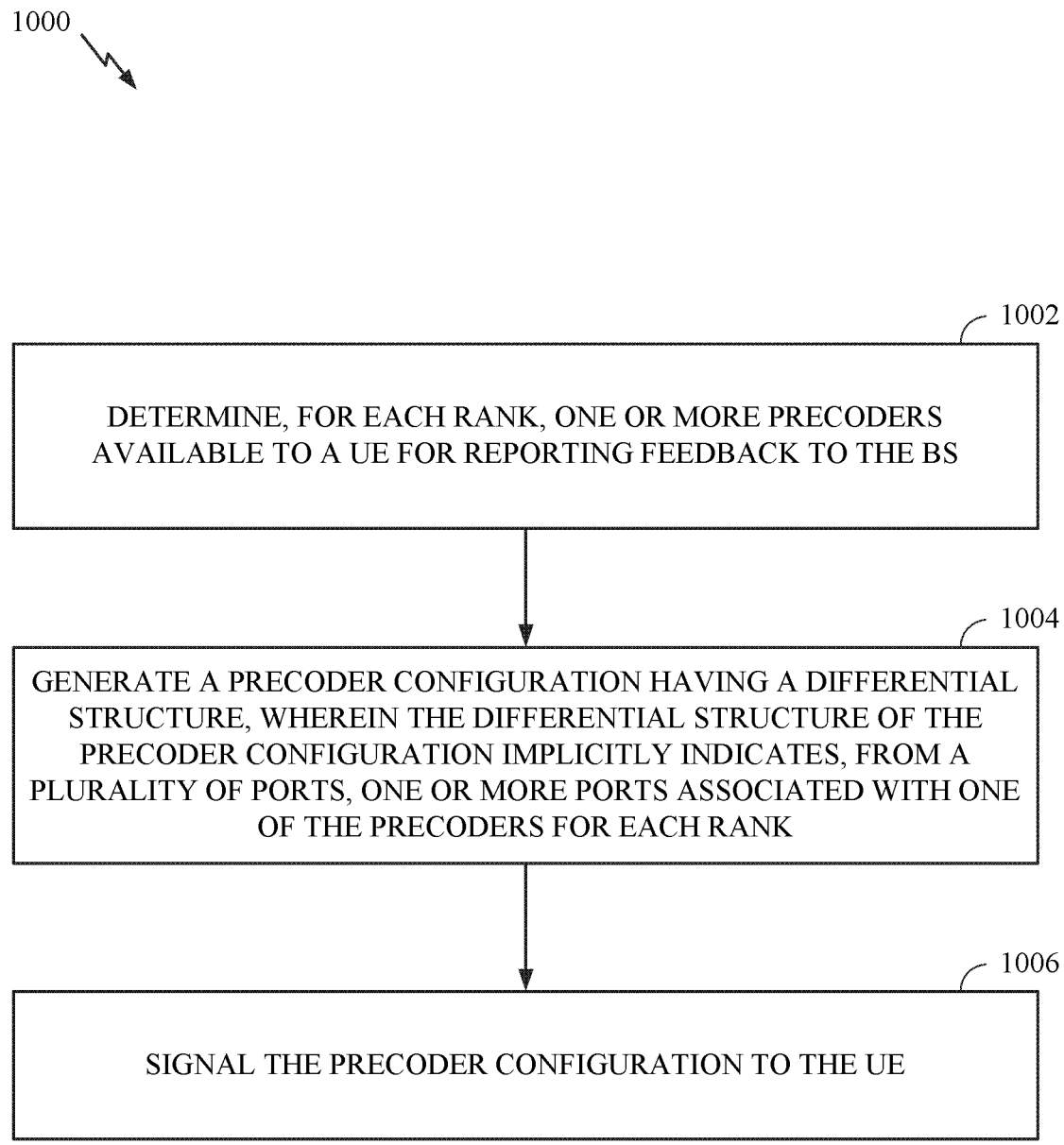
FIG. 10 is a flow diagram illustrating example operations that may be performed by a BS, for implicitly signaling precoder(s) for non-PMI based CSI feedback, in accordance with certain aspects of the present disclosure.

FIG. 10 is a flow diagram illustrating example operations 1000 that may be performed, for example, by a BS (e.g., BS 110), for implicitly signaling a precoder for each rank to a UE to report non-PMI based CSI feedback, in accordance with certain aspects of the present disclosure.

Operations 1000 may begin, at 1002, where the BS determines, for each rank, one or more precoders available to a UE (e.g., UE 120) for reporting feedback to the BS. At 1004, the BS generates a precoder configuration having a differential (or nested) structure. The differential structure of the precoder configuration implicitly indicates, from a plurality of ports, one or more ports associated with one of the precoders for each rank. At 1006, the BS signals the precoder configuration to the UE.

Figure 11:
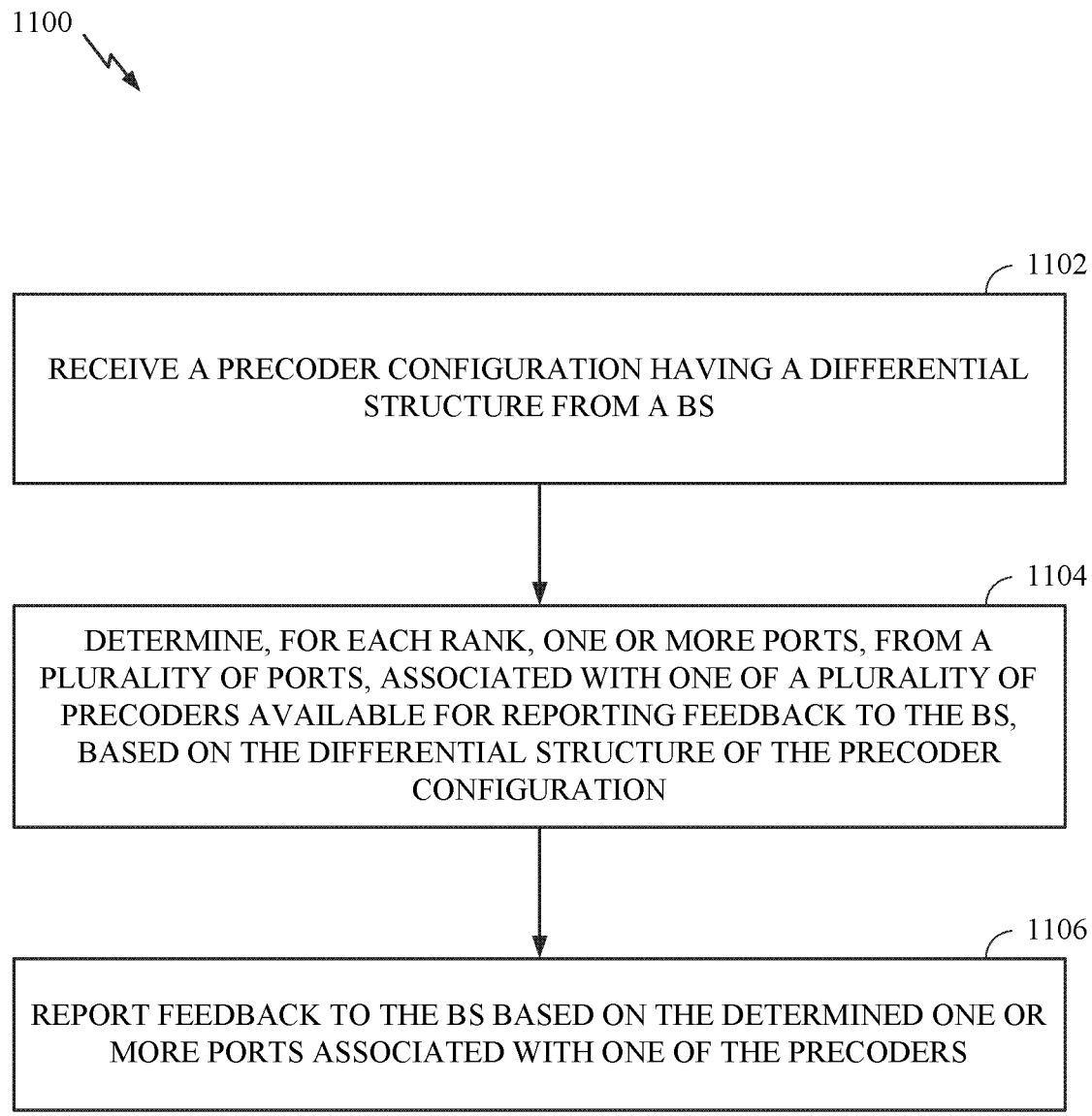
FIG. 11 is a flow diagram illustrating example operations that may be performed by a UE, for reporting non-PMI based CSI feedback, based on an implicit precoder configuration, in accordance with certain aspects of the present disclosure.

FIG. 11 is a flow diagram illustrating example operations 1100 that may be performed, for example, by a UE (e.g., UE 120) for reporting non-PMI based CSI feedback based on an implicit precoder configuration received from a BS (e.g., BS 110).

Operations 1100 may begin, at 1102, where the UE receives a precoder configuration having a differential structure from a BS (e.g., BS 110). At 1104, the UE determines, for each rank, one or more ports, from a plurality of ports, associated with one of a plurality of precoders available for reporting feedback to the BS, based on the differential structure of the precoder configuration. At 1106, the UE reports feedback to the BS based on the determined one or more ports associated with one of the precoders.

In some aspects, the (implicit) precoder configuration may include a nested port configuration, such that the port selection for rank R is a subset of the port selection for rank R*, assuming R<R*. In one aspect, the (implicit) precoder configuration may include a bitmap having a differential structure. For example, a first one or more bits of the bitmap may indicate a first set of ports associated with a first precoder for a first rank, and at least the first one or more bits of the bitmap and a second one or more bits of the bitmap may indicate at least a second set of ports associated with at least a second precoder for at least a second rank, where the second rank is greater than the first rank.

In one reference example, the bitmap may include X bits to indicate the ports associated with the precoder for rank-1. The bitmap may then use X−1 bits to introduce the additional port for rank-2. Thus, the X−1 bits together with the port indicated for rank-1 may form the 2 ports associated with the precoder for rank-2. In general, the BS may use X−R+1 bits to indicate the one or more additional ports associated with the precoder for rank-R. The BS may cascade the bit allocations for all ranks to obtain a total of $\Sigma_{R=1}^{R_{max}} X-R-1$ bits for the (implicit) precoder configuration. Assuming $R_{max}$=8 and X=12, such a precoder configuration may include 68 bits.

Once the UE receives a bitmap having a nested port configuration, the UE may obtain the port for rank-1 using the first X bits; obtain ports for rank-2 using the port for rank-1 and the additional port indicated by the $(X+1)^{th}$ bit to the $(2X-1)^{th}$ bit; and obtain the ports for rank-R using the port for rank-(R−1) and the additional port indicated by the $(1+\Sigma_{r=1}^{R-1}X-r+1)^{th}$ bit to the $\Sigma_{r=1}^{R}X-r+1^{th}$ bit.

In some aspects, the (implicit) precoder configuration may have a nested structure that implicitly indicates the possible port combinations for each rank to the UE. For example, such a precoder configuration may include one or more bits, where a first set of the one or more bits indicates a first set of the ports associated with a first precoder for a first rank, and at least the first set of the one or more bits and a second set of the one or more bits indicate at least a second set of ports associated with at least a second precoder for at least a second rank. The second rank may be greater than the first rank.

In one reference example, the precoder configuration may use $[\log_2 X]$ bits to indicate the X possibilities for rank-1, $[\log_2 X-1]$ to indicate the X−1 possibilities for rank-2, . . . , and $[\log_2 X-R+1]$ bits to indicate the X−R+1 possibilities for rank-R. The BS may cascade the bits allocation for all ranks to obtain a total of $\Sigma_{R=1}^{R_{max}}[\log_2 X-R+1]$ bits for the precoder configuration. Assuming $R_{max}=8$ and X=12, such a precoder configuration may include 28 bits. Once the UE receives such a precoder configuration, the UE may obtain the port for rank-1 using the first $[\log_2 X]$ bits, obtain the ports for rank-2 using the port for rank-1 and the additional port indicated by the $([\log_2 X]+1)^{th}$ bit to the $([\log_2 X]+[\log_2(X-1)])^{th}$ bit, and obtain the ports for rank-R using the port for rank-(R−1) and the additional port indicated by the $(1+\Sigma_{r=1}^{R-1}[\log_2(X-r+1)])^{th}$ bit to the $\Sigma_{r=1}^{R}[\log_2(X-r+1)]^{th}$ bit. Assuming $R_{max}=8$ and X=12, such a precoder configuration may include 28 bits.

In some aspects, the BS and/or network may indicate the $R_{max}$ ports with a certain ordering (e.g., the first R bits may be used for rank R). In this aspect, the (implicit) precoder configuration may have a nested structure that indicates an ordering of the ports associated with the precoder for a given rank. For example, the precoder configuration may include multiple bits indicating an ordering of the one or more ports. A first port of the ordered one or more ports may indicate the first port is associated with a first precoder for a first rank, and the first port of the ordered one or more ports and at least a second port of the ordered one or more ports may indicate the first port and at least the second port are associated with at least a second precoder for at least a second rank.

By ordering the ports, the precoder configuration may indicate that the first port is used for rank-1, the $1^{st}$ and $2^{nd}$ ports are used for rank-2, the $1^{st}$ to $3^{rd}$ ports are used for rank-3, . . . , and the $1^{st}$ to $R^{th}$ ports are used for rank-R. In some cases, the mapping from the ordering of the one or more ports to the multiple bits of the precoder configuration may be based on a table or set of tables. The number of the ordered ports may be equal to the maximum rank.

In one reference example, assuming there are ports $R_{max}$, there may be a total of $[\log_2(\Pi_{R=1}^{R_{max}}X-R+1)]=[\Sigma_{R=1}^{R_{max}}\log_2(X-R+1)]$ bits may be used to indicate a total of $\Pi_{R=1}^{R_{max}}X-R+1$ possibilities of port combinations for all ranks. In some cases, the BS and/or UE may use a table or set of tables to determine the reported bits based on selection of the ordered $R_{max}$ ports. Assuming $R_{max}=8$ and X=12, such a precoder configuration may include 25 bits.

Aspects presented herein provide techniques for configuring a UE to measure interference from a BS using one or more ports.

For example, as noted, the BS and/or network may transmit one or more CSI-RS to the UE from one or more ports (e.g., X ports). As also noted, the BS and/or network may transmit a precoder configuration to the UE that indicates which port(s) (e.g., Y different ports) of the X ports are associated with the single precoder for a given rank. In some cases, the BS may configure the UE to use the remaining X-Y ports for measuring interference from the BS.

In particular, in some aspects, the BS and/or network may generate an interference measurement (IM) configuration indicating whether the UE is to use a remaining one or more ports from the plurality of ports (e.g., remaining X-Y ports) for measuring interference from the BS. That is, in one reference example, the BS may generate an "IMConfig" indicating whether one or more ports that are not indicated in the "PrecoderConfig" are used for measuring interference. The BS may signal the interference measurement configuration to the UE. The interference measurement configuration can be semi-statically configured (e.g., via RRC or MAC CE signaling) or dynamically configured (e.g., via DCI). In some aspects, the interference measurement configuration can be encoded together with the precoder configuration and/or rank configuration (described in more detail below). In some aspects, the interference measurement configuration, rank configuration (described in more detail below) and/or the precoder configuration may be separately encoded.

Once the UE receives the interference measurement configuration and the precoder configuration, the UE may perform a channel measurement using the Y ports associated with the precoder (e.g., indicated by the precoder configuration). The UE may then decide whether to perform an interference measurement using the remaining X-Y ports, based on the indication in the interference measurement configuration. For example, the UE may perform the interference measurement using the X-Y ports if the interference measurement configuration indicates to use the X-Y ports for measuring interference from the BS. Alternatively, the UE may refrain from performing the interference measurement using the X-Y ports if the interference measurement configuration indicates to refrain from using the X-Y ports for measuring interference from the BS.

According to certain aspects, there may be some situations in which one or more ranks are inactive, different combinations of ranks are supported, etc. For example, in a four rank system, the supported combinations may include {1,2}, {2,4}, {1,2,4}, etc. In such situations, the BS and/or network may configure the UE with a selected rank from a plurality of available ranks.

In particular, in some cases, the BS and/or network may generate a rank configuration (e.g., "RankConfig") indicating a rank selected from one or more available ranks and transmit the rank configuration to the UE. In some cases, the precoder configuration may apply to the rank indicated by the rank configuration. For example, the precoder configuration may (explicitly/implicitly) indicate one or more ports associated with one of the precoders for the selected rank indicated by the rank configuration.

In one aspect, the format of the rank configuration may include a bitmap, where a length of the bitmap is equal to a number of the available ranks. In one reference example, in NR where the rank can be up to 8, the length of the bitmap may be equal to 8 bits. In one aspect, the format of the rank configuration may include a joint encoding of the selected rank for different numbers of possible ranks. For example, the rank configuration may include one or more bits indicating a selected rank for one or more different combinations of available ranks. In one reference example, the joint encoding of the selected rank may include $$\left\lceil \log\left(\frac{\overline{N}}{N_R}\right) \right\rceil$$

bits, where $\overline{N}$ is the total number of possible ranks, and $N_R$ is the number of active ranks. In some cases, the BS and/or UE may use a table or set of tables to interpret the configured ranks and the encoded bits. That is, the mapping from the selected rank for the one or more different combinations of available ranks to the one or more bits in the joint encoding may be determined based on a table or set of tables.

In some aspects, the rank configuration and the precoder configuration can be separately encoded. In that case, the format (e.g., payload size) of the precoder configuration may follow the rank configuration. In some aspects, the rank configuration can be encoded together with the precoder configuration. That is, there may be a joint encoding of two configurations (e.g., rank configuration and precoder configuration). For example, a first one or more bits may be used for the rank configuration, and a second one or more bits may be used for the precoder configuration. In some aspects, the BS and/or network may generate a joint configuration of the rank and precoder having plurality of bits. That is, the BS and/or network may encode a joint configuration of the rank and precoder. In some cases, the BS may pad one or more zeros at the end of the joint configuration to maintain a constant payload size for the joint configuration and joint encoding.

In some aspects, at least one of the rank configuration, the precoder configuration, the interference measurement configuration or the joint configuration is separately encoded. In some aspects, at least two of the rank configuration, precoder configuration, the interference measurement configuration or the joint configuration are jointly encoded. In general, any one of or combination of the configurations described herein can be separately encoded and/or jointly encoded.

According to certain aspects, at least one of the precoder configuration or the rank configuration may be semi-statically configured (e.g., by the BS and/or network) via RRC signaling or MAC CE signaling. In some cases, the current semi-static configuration may be active until the next semi-static configuration. For example, at least one of a first precoder configuration or a first rank configuration that is semi-statistically configured may be active until at least one of a second precoder configuration or a second rank configuration is semi-statically configured.

Accordingly to certain aspects, at least one of the precoder configuration or the rank configuration may be dynamically configured (e.g, by the BS and/or network). In some aspects, the dynamic configuration may be via a one-stage DCI. In some aspects, the dynamic configuration may be via two-stage DCI. For example, in one case, the $1^{st}$ stage may be for dynamically configuring the rank configuration and the $2^{nd}$ stage may be for dynamically configuring the precoder configuration. The current configuration may be active once (e.g., such as for an aperiodic CSI report) or until the next configuration. That is, at least one of a first precoder configuration or a first rank configuration that is dynamically configured may be active once or active until at least one of a second precoder configuration or a second rank configuration is dynamically configured.

According to certain aspects, the precoder configuration and/or the rank configuration may be semi-statically and/or dynamically configured. For example, at least one of a first precoder configuration or a first rank configuration may be semi-statically configured for a first one or more time periods, and at least one of a second precoder configuration or second rank configuration may be dynamically configured for a second one or more time periods. In some cases, the dynamic configuration may override the semi-static configuration. For example, the dynamic configuration may be active once (e.g., aperiodic CSI report) or until the next configuration. In general, however, techniques presented herein may support any combination of: (1) semi-static configuration: precoder configuration only, or rank configuration only, or precoder configuration+rank configuration; or (2) dynamic configuration: precoder configuration only, rank configuration only, or precoder configuration+rank configuration. Table I, for example, illustrates examples of different combinations of semi-static and dynamic configurations. In each column of Table I, the dynamic configuration may override the semi-static configuration.

TABLE I

Example Semi-static and/or Dynamic Configuration Types

| | | | | |
|---|---|---|---|---|
| Semistatic | Precoder + rank (Subset of rank are available, followed by a precoder config) | Precoder + rank (Subset of rank are available, followed by a precoder config) | Precoder (all ranks are active, followed by a precoder config) | Rank (subset of rank are available, no precoder config) |
| Dynamic | Precoder + rank (different rank and precoder are used) | Rank (different subset of rank is active, precoder follow the Semi-static config) | Rank (subset of rank is active, precoder follow the Semi-static config) | Precoder (rank follow the Semi-static config, precoder configured dynamically) |

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a base station (BS), comprising:
   determining, for each rank, one or more precoders available to a user equipment (UE) for reporting feedback to the BS;
   generating a precoder configuration having a differential structure, wherein the differential structure of the precoder configuration implicitly indicates, from a plurality of ports, one or more ports associated with one of the precoders for each rank; and
   signaling the precoder configuration with the differential structure to the UE.

2. The method of claim 1, further comprising:
   generating an interference measurement configuration indicating whether the UE is to use a remaining one or more ports, from the plurality of ports, for measuring interference from the BS; and
   signaling the interference measurement configuration to the UE.

3. The method of claim 2, further comprising:
   generating a rank configuration indicating a rank selected from one or more available ranks; and
   signaling the rank configuration to the UE.

4. The method of claim 3, wherein the precoder configuration implicitly indicates one or more ports associated with one of the precoders for the selected rank indicated by the rank configuration.

5. The method of claim 3, wherein generating the precoder configuration comprises generating the precoder configuration based in part on the rank configuration.

6. The method of claim 3, wherein:
   generating the precoder configuration, generating the rank configuration and generating the interference measurement configuration comprises generating a joint configuration of at least two of the precoder configuration, rank configuration or interference measurement configuration having a plurality of bits; and
   signaling the joint configuration to the UE.

7. The method of claim 6, wherein at least one of the rank configuration, the precoder configuration, the interference measurement configuration or the joint configuration is separately encoded.

8. The method of claim 3, wherein at least one of the interference measurement configuration, precoder configuration or the rank configuration is semi-statically configured.

9. The method of claim 8, wherein:
   after the semi-static configuration, the at least one of the semi-statically configured precoder configuration, interference measurement configuration or rank configuration is overridden by at least one of a dynamically configured precoder configuration, interference measurement configuration or rank configuration.

10. The method of claim 3, wherein at least one of the interference measurement configuration, precoder configuration or the rank configuration is dynamically configured.

11. The method of claim 10, wherein:
    the rank configuration is dynamically configured via a first stage of downlink control information (DCI); and
    the precoder configuration is dynamically configured via a second stage of DCI.

12. The method of claim 3, wherein the interference measurement configuration is encoded separately from at least one of the precoder configuration or rank configuration.

13. The method of claim 1, wherein:
    the precoder configuration comprises one or more bits;
    a first set of the one or more bits indicates a first set of the ports associated with a first precoder for a first rank; and
    at least the first set of the one or more bits and a second set of the one or more bits indicate at least a second set of ports associated with at least a second precoder for at least a second rank.

14. The method of claim 13, wherein the second rank is greater than the first rank.

15. The method of claim 1, wherein:
    the precoder configuration comprises a plurality of bits indicating an ordering of the one or more ports;
    a first port of the ordered one or more ports indicates the first port is associated with a first precoder for a first rank; and
    the first port of the ordered one or more ports and at least a second port of the ordered one or more ports indicate the first port and at least the second port are associated with at least a second precoder for at least a second rank.

16. A method for wireless communication by a user equipment (UE), comprising:
    receiving a precoder configuration having a differential structure from a base station (BS);
    determining, for each rank, one or more ports, from a plurality of ports, associated with one of a plurality of precoders available for reporting feedback to the BS, based on the differential structure of the precoder configuration; and
    reporting feedback to the BS based on the determined one or more ports associated with one of the precoders.

17. The method of claim 16, further comprising:
receiving from the BS an interference measurement configuration comprising an indication of whether the UE is to use a remaining one or more ports, from the plurality of ports, for measuring interference from the BS; and
determining whether to perform an interference measurement using the remaining one or more ports, based on the interference measurement configuration.

18. The method of claim 17, further comprising receiving a rank configuration indicating a selected rank from one or more available ranks.

19. The method of claim 18, wherein the one or more ports associated with the one or more ports are determined for the selected rank indicated from the rank configuration.

20. The method of claim 18, wherein a format of the precoder configuration is based in part on the rank configuration.

21. The method of claim 18, wherein:
receiving the precoder configuration, the interference measurement configuration and the rank configuration comprises receiving a joint configuration of at least two of the precoder configuration, rank configuration or interference measurement configuration; and
the joint configuration comprises a plurality of bits.

22. The method of claim 18, wherein at least one of the interference measurement configuration, precoder configuration or the rank configuration is semi-statically configured.

23. The method of claim 22, wherein:
after receiving the semi-static configuration, the at least one of the semi-statically configured precoder configuration, interference measurement configuration or rank configuration is overridden by at least one of a dynamically configured precoder configuration, interference measurement configuration or rank configuration.

24. The method of claim 18, wherein at least one of the interference measurement configuration, precoder configuration or the rank configuration is dynamically configured.

25. The method of claim 24, wherein:
the rank configuration is dynamically configured via first stage of downlink control information (DCI); and
the precoder configuration is dynamically configured via a second stage of DCI.

26. The method of claim 16, wherein:
the precoder configuration comprises one or more bits; and
the determining comprises:
determining a first set of the one or more bits indicates a first set of the ports associated with a first precoder for a first rank; and
determining at least the first set of the one or more bits and a second set of the one or more bits indicate at least a second set of ports associated with at least a second precoder for at least a second rank.

27. The method of claim 26, wherein the second rank is greater than the first rank.

28. The method of claim 16, wherein:
the precoder configuration comprises a plurality of bits indicating an ordering of the one or more ports; and
the determining comprises:
determining a first port of the ordered one or more ports indicates the first port is associated with a first precoder for a first rank; and
determining the first port of the ordered one or more ports and at least a second port of the ordered one or more ports indicate the first port and at least the second port are associated with at least a second precoder for at least a second rank.

29. An apparatus comprising:
at least one processor configured to:
determine, for each rank, one or more precoders available to a user equipment (UE) for reporting feedback to the apparatus;
generate a precoder configuration having a differential structure, wherein the differential structure of the precoder configuration implicitly indicates, from a plurality of ports, one or more ports associated with one of the precoders for each rank; and
signal the precoder configuration with the differential structure to the UE; and
a memory coupled to the at least one processor.

30. An apparatus comprising:
at least one processor configured to:
receive a precoder configuration having a differential structure from a base station (BS);
determine, for each rank, one or more ports, from a plurality of ports, associated with one of a plurality of precoders available for reporting feedback to the BS, based on the differential structure of the precoder configuration; and
report feedback to the BS based on the determined one or more ports associated with one of the precoders; and
a memory coupled to the at least one processor.

* * * * *